(12) United States Patent
Allmaras et al.

(10) Patent No.: US 11,347,996 B2
(45) Date of Patent: May 31, 2022

(54) SYSTEM STATE PREDICTION

(71) Applicant: Siemens Aktiengesellschaft, Munich (DE)

(72) Inventors: Moritz Allmaras, Munich (DE); Birgit Obst, Munich (DE)

(73) Assignee: SIEMENS AKTIENGESELLSCHAFT

( * ) Notice: Subject to any disclaimer, the term of this patent is extended or adjusted under 35 U.S.C. 154(b) by 916 days.

(21) Appl. No.: 16/106,153

(22) Filed: Aug. 21, 2018

(65) Prior Publication Data
US 2019/0138886 A1 May 9, 2019

(30) Foreign Application Priority Data

Aug. 8, 2017 (EP) ..................... 17184735

(51) Int. Cl.
| | |
|---|---|
| G06N 3/04 | (2006.01) |
| G06N 7/00 | (2006.01) |
| G05B 13/04 | (2006.01) |
| G05B 17/02 | (2006.01) |
| G05B 13/02 | (2006.01) |

(52) U.S. Cl.
CPC ......... G06N 3/0445 (2013.01); G05B 13/027 (2013.01); G05B 13/048 (2013.01); G05B 17/02 (2013.01); G06N 3/0427 (2013.01); G06N 7/005 (2013.01)

(58) Field of Classification Search
CPC .... G06N 3/0427; G06N 3/0445; G06N 5/007; G05B 13/048
See application file for complete search history.

(56) References Cited

U.S. PATENT DOCUMENTS

| | | | |
|---|---|---|---|
| 8,600,917 B1 | 12/2013 | Schimert et al. | |
| 10,194,850 B2 * | 2/2019 | Kovatchev | ......... A61B 5/14532 |
| 2004/0071207 A1 * | 4/2004 | Skidmore | .......... H03H 21/0043 |
| | | | 375/233 |
| 2010/0030529 A1 | 2/2010 | Nishiyama | |

(Continued)

FOREIGN PATENT DOCUMENTS

| | | |
|---|---|---|
| CN | 101421923 A | 4/2009 |
| CN | 104485866 A | 4/2015 |

(Continued)

OTHER PUBLICATIONS

European Extended Search Report dated Mar. 12, 2018, Application No. 17184735.3.

(Continued)

Primary Examiner — Hal Schnee
(74) Attorney, Agent, or Firm — Schmeiser, Olsen & Watts LLP

(57) ABSTRACT

A method which includes steps of providing a state space model of behaviour of a physical system, the model including covariances for state transition and measurement errors, providing a data based regression model for prediction of state variables of the physical system, observing a state vector comprising state variables of the physical system, determining a prediction vector of state variables based on the state vector, using the regression model, and combining information from the state space model with predictions from the regression model through a Bayesian filter, is provided.

10 Claims, 4 Drawing Sheets

(56) References Cited

U.S. PATENT DOCUMENTS

| | | | |
|---|---|---|---|
| 2014/0324339 A1* | 10/2014 | Adam | G01S 13/726 |
| | | | 701/519 |
| 2017/0267374 A1* | 9/2017 | Derenick | B63B 35/50 |
| 2018/0004171 A1* | 1/2018 | Patel | F24F 11/62 |
| 2018/0020978 A1* | 1/2018 | Kaifosh | G16H 50/50 |
| | | | 702/150 |
| 2018/0035605 A1* | 2/2018 | Guan | A01G 22/00 |
| 2018/0348717 A1* | 12/2018 | Zhao | G05B 17/02 |
| 2019/0041811 A1* | 2/2019 | Drees | G06N 3/08 |
| 2019/0222155 A1 | 7/2019 | Liu | |

FOREIGN PATENT DOCUMENTS

| | | |
|---|---|---|
| CN | 106533299 A | 3/2017 |
| JP | 2007052652 A | 3/2007 |
| JP | 2009031096 A | 2/2009 |
| JP | 4389046 B2 | 12/2009 |
| JP | 5089281 B2 | 12/2012 |
| KR | 20000027185 A | 5/2000 |

OTHER PUBLICATIONS

Chinese Office Action dated Jul. 30, 2021 for Application No. 201810895969.8.

\* cited by examiner

SYSTEM STATE PREDICTION

CROSS-REFERENCE TO RELATED APPLICATIONS

This application claims priority to European application No. EP17184735.3 having a filing date of Aug. 8, 2017, the entire contents of which are hereby incorporated by reference.

FIELD OF TECHNOLOGY

The following concerns the prediction of the future state of a dynamical system. More particularly embodiments of the present invention concern the combination of different models for state prediction.

BACKGROUND

During start-up, an asynchronous electric motor converts a considerable portion of the electric current that flows through it into heat, which may build up sharply on a pole shoe of the rotor. This happens due to slippage of magnetic fields between the stator and the rotor while the rotor rotates slower than the electrical frequency dictates. Such excess heat can cause structural damage to the motor and therefore needs to be closely monitored. Since the pole shoe is part of the rotating assembly, a sensor for direct temperature measurement of the pole shoe surface cannot be placed in a production device due to the high associated cost. Hence, a simulation model for calculation and prediction of these temperatures may be set up.

Prediction of system state is traditionally performed using either a physical model or a data-based regression model. The physical model is susceptible to modelling errors and needs calibration. The data driven model can only predict behaviour that can be directly observed in real systems. A data driven model will produce poor results if the space of possible control inputs is not densely sampled in the recorded data.

It is therefore a task of embodiments of the present invention to provide an improved technique for predicting the state vector of a physical system.

SUMMARY

A method comprises steps of providing a state space model of behaviour of a physical system, the model including covariances for state transition and measurement errors; providing a data based regression model for prediction of state variables of the physical system; observing a state vector comprising state variables of the physical system; determining a prediction vector of state variables based on the state vector, using the regression model; and combining information from the state space model with predictions from the regression model through a Bayesian filter.

The method may be used to make predictions for one or more state variables of the state vector. Behavior of the physical system may thus be forecast and a potentially dangerous situation may be identified even before it occurs. A countermeasure to prevent that situation may be conducted in time. Should the covariances for state transition and measurement errors not be available, estimations thereof may be used.

The method combines a mathematical model of system behaviour based on the physics of the underlying process and measurement data collected during operation of actual instances of the real system. Due to the combination, in practical applications the prediction accuracy of the described method is expected to be improved when compared to the prediction accuracy achieved by using a model-driven approach by itself. On the other hand, data-driven approaches by themselves do not allow prediction of unobserved state variables.

The physical system is preferred to be a time-discrete linear time-invariant system but other systems can also be addressed, as will be shown below. Note that the system must be physical for the physical model to make sense. The system may for instance represent a mechanism for carrying out a predetermined technical process or a motor, especially an asynchronous electric motor.

The Bayesian filter may be realized by a Kalman filter. The Kalman filter can be used for making a prediction for the state vector by carrying out only steps of predicting an estimate and predicting a covariance for each time step. The Kalman filter will be adequate to a Bayes filter if the filter variables are linear and normally distributed. Kalman filtering is state-of-the-art and can be done with moderate computational means. Processing libraries are available for a broad range of processing environments.

The Bayesian filter may be realized through an Extended Kalman filter. This may be especially useful if the physical system is nonlinear. The Extended Kalman filter (EKF) is the nonlinear version of the Kalman filter which linearizes about an estimate of the current mean and covariance. In the case of well-defined transition models, the EKF has been considered the de facto standard in the theory of nonlinear state estimation. The EKF may therefore allow for both linear and nonlinear variables, making it more flexible and versatile.

The Bayesian filter may also comprise a particle filter. This may be especially advantageous if a distribution of the measurement errors is non-Gaussian. The particle filter is also called a Sequential Monte Carlo (SMC) method for solving filtering problems in Bayesian filter inference.

The regression model may comprise a trained recurrent neural network (RNN). The RNN may be used to predict system outputs for given control inputs. The RNN may be trained offline and deployed to the place where the method is carried out. In an RNN, connections between units generally form a directed cycle, so that the RNN may exhibit dynamic temporal behavior. Unlike feedforward neural networks, RNNs can use their internal memory to process arbitrary sequences of inputs. This ability makes an RNN a favourable choice for the regression model. In other embodiments, a different machine learning method that allows time series regression from a given input signal may also be used.

Especially if the physical system is time continuous, the Recurrent Neural Network may be interpolated between discrete time steps and the Bayesian filter may comprise a Continuous Kalman Filter. In that case, the state equation of the state space system model may be continuous, too.

An apparatus comprises an interface for observing a state vector comprising state variables in a physical system; and processing means adapted to carry out above-described method completely or in part. To this end, the described method may be formulated as a computer program product (non-transitory computer readable storage medium having instructions, which when executed by a processor, perform actions) with program code means. Advantages or features of the method may apply to the apparatus and vice versa.

BRIEF DESCRIPTION

Some of the embodiments will be described in detail, with reference to the following figures, wherein like designations denote like members, wherein FIG. 1 shows schematically how a Kalman filter may be used for state prediction;

DETAILED DESCRIPTION

Figure 1:
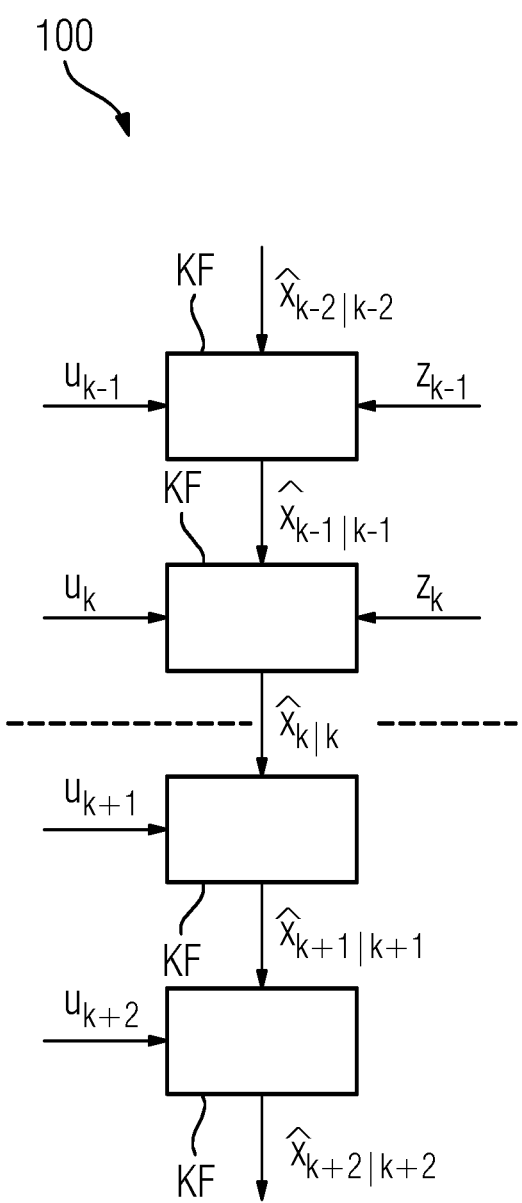

Prediction of system state is traditionally performed using one of the following approaches:
i) A mathematical model is derived from the physical system behaviour and numerically simulated forward in time, starting from a known initial state and using given future system inputs.
ii) Measurements are collected from a real system and a data-based regression model is constructed that allows prediction of the system output given its inputs.

Approach i) is susceptible to modelling errors, i.e. the model not describing the behaviour of the actual real-world system with sufficient accuracy. Deriving a model that covers all relevant behaviour of a real-world system with respect to the intended application can be a challenging problem. Calibration needs to be performed in order to adapt model parameters to match observed system behaviour as accurately as possible. But even then, any unmodeled dynamics in the system will substantially degrade long-term prediction performance of the model-driven approach.

In Approach ii), machine learning techniques are used to train a data-driven model in order to learn the behaviour of the system from recorded measurements of system output for given control inputs. This approach does not suffer from errors due to unmodeled dynamics, but on the other hand can only predict behaviour that can be directly observed in real systems. Any part of the system state that is not observed through outputs cannot be targeted by data-driven methods without a model of how these states are connected to observable quantities. In addition, if the space of possible control inputs is not densely sampled in the recorded data, a data-driven approach will produce poor prediction results for control inputs that are far from the inputs covered by the recorded data. Also, the accuracy of data-driven prediction approaches inherently depends on the accuracy of measurements.

The method described herein combines approaches i) and ii) to allow more accurate state predictions than would be possible by using either of the two approaches by themselves.

Ingredients to the proposed method are the following:
a) a state space description of the system behaviour including covariances for state-transition and measurement errors (or estimates thereof),
b) a data-based regression model for predicting system outputs to given control inputs,
c) a Bayesian filter method for combining information from the state space model with predictions from the regression model.

The method makes use of these ingredients to predict system state over a time range in the future for which the control input is given. In the following, for clarity of exposition, the method is detailed using specific variants for a), b) and c). However, it is noted that the method is applicable in a much more general setting.

In particular, for the detailed exposition we assume that the system under consideration is a time-discrete linear time-invariant (LTI) system, in which all random variables are normally distributed, For the Bayesian filter the well-known Kalman-filter method is applied, A recurrent neural network is trained using historic measurements to predict system outputs for given control inputs.

State-space system model

A time-discrete LTI system can be described by the equations:

$$x_k = Ax_{k-1} Bu_k + w_k$$

$$z_k = Hx_k + v_k$$

Here, $x_k$ denotes the system state at time step k, A is the state-transition matrix, B the control matrix, $u_k$ the input and $w_k$ the process noise at time step k. Likewise, in the output equation, $z_k$ are the measurements, H the output matrix and $v_k$ the measurement noise at time step k.

We assume that the noise terms $w_k$ and $v_k$ are mean-free normally distributed random variables with covariance matrix $Q_k$ and $R_k$ respectively: $v_k \sim N(0, Q_k)$, $w_k \sim N(0, R_k)$.

The problem of state prediction can now be stated as follows: Given an initial state $x_0$ and known control inputs $u_j$ for j in $\{1, \ldots K\}$, predict the system state $x_j$ for each j in $\{1, \ldots K\}$.

In addition to the state space model given above, it is assumed that large amounts of historic data from existing instances of the real-world system are available. This historic data consists of a large number M of sets of inputs $\{u_j^s\}_{j=1}^K$ with corresponding measurements of outputs $\{z_j^s\}_{j=1}^K$:

$$\{U^s\}_{s=1}^M, \text{ where } U^s = [\{u_j^s\}_{j=1}^K, \{z_j^s\}_{j=1}^K].$$

Kalman Filter

FIG. 1 shows schematically a method 100 of using a Kalman-filter for state prediction. A present point in time is indicated as a broken line between times k and k+1. Times k, k−1 and lower are considered to lie in the past and times k+1, k+2 and higher in the future.

The Kalman-filter method provides an estimator $\hat{x}_{k|k}$ for the system state at time k given measurements at time k. The algorithm consists of the following computational steps:

$$\hat{x}_{k|k-1} = A\hat{x}_{k|k-1} + Bu_k \quad \text{Predicted estimate:}$$

$$P_{k|k-1} = AP_{k-1|k-1}A^T + Q_{k-1} \quad \text{Predicted covariance:}$$

$$\tilde{y}_k = z_k - H\hat{x}_{k|k-1} \quad \text{Measurement residual:}$$

$$S_k = HP_{k|k-1}H^T + R_k \quad \text{Residual covariance:}$$

$$K_k = P_{k|k-1}H^T + R_k \quad \text{Kalman gain matrix:}$$

$$\hat{x}_{k|k} = \hat{x}_{k|k-1} + K_k\tilde{y}_k \quad \text{Corrected prediction:}$$

$$P_{k|k} = (I - K_kH)P_{k|k-1} \quad \text{Corrected covariance:}$$

Given previous state and current measurements, the Kalman-filter is known to compute the optimal estimate of the current state and its covariance. The Kalman-filter can also be used for predicting future states if only the first two prediction steps are carried out in each time step. However, in this case there is no correction from measurements being applied, and this leads to a rapid increase of the covariance of predicted states, indicating that the uncertainty of predicted state values increases rapidly with increasing time step.

Figure 2:
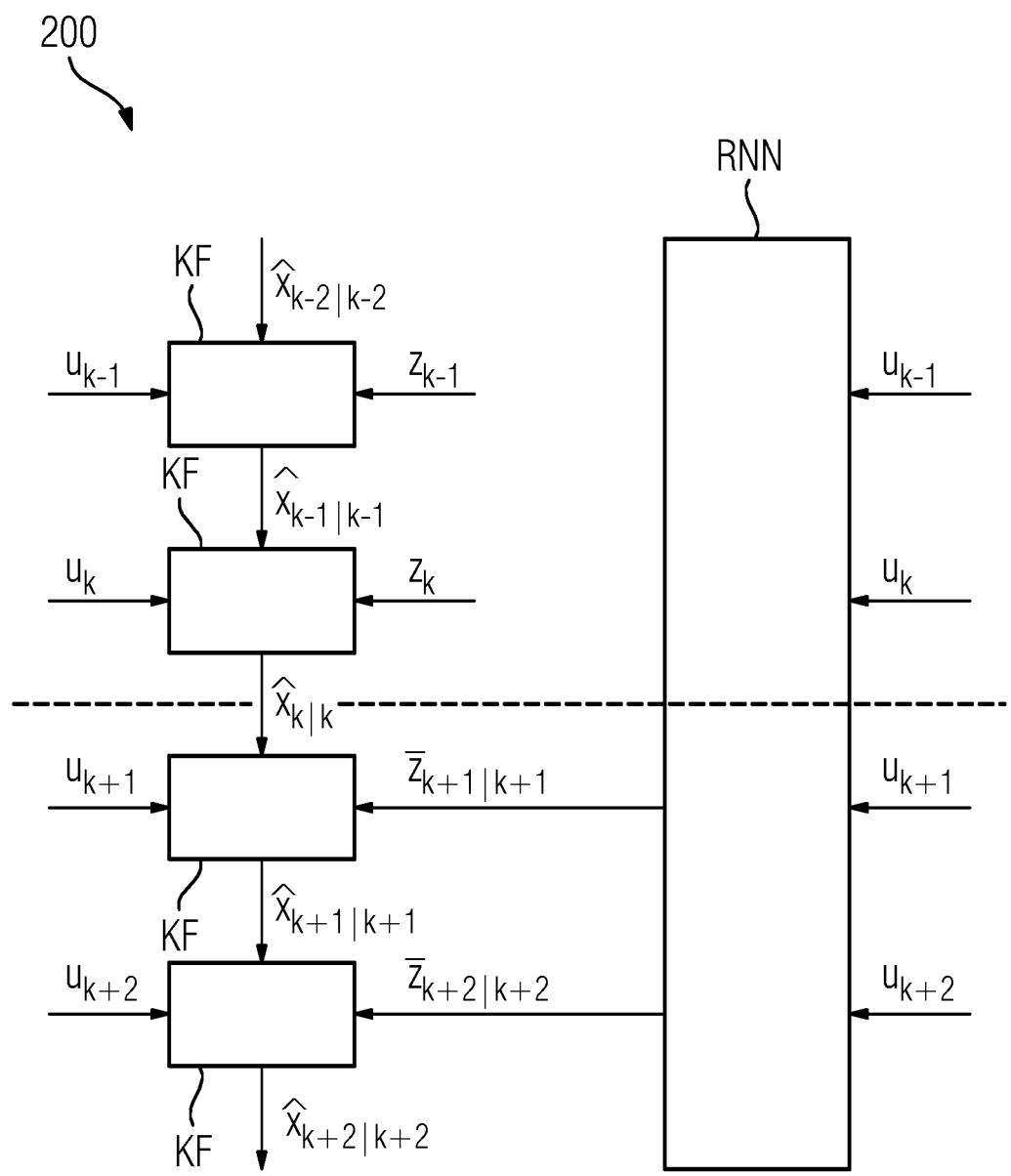
FIG. 2 shows a schematic representation of a method for providing improved state information prediction.

A schematic representation of a method for system state prediction is shown in FIG. 2. As in FIG. 1, a broken line symbolically separates a past (above) from a future (below).

Data-driven regression model for measurement prediction

For the regression model, the available historic data $\{U^s\}_{s=1}^M$ is split into training $\{U^s\}_{s=1}^m$ and validation $\{U^s\}_{s=m+1}^M$ data sets. A Recurrent Neural Network RNN is trained on the training set and then applied for predicting system outputs $\bar{z}_j$ to given inputs $u_j$:

$$\{\bar{z}_j\}_{j=1}^K = RNN(\{u_j\}_{j=1}^K)$$

The trained Recurrent Neural Network RNN is then applied to the validation data set and the predicted validation output is compared to the measured validation outputs to create an empirical covariance matrix $\bar{Q}_k$ for the expected error of the RNN prediction for each time step k.

Combination

Finally, the method suggested herein combines the state-space and data-driven models to produce a joint state prediction $\{\bar{x}_j\}_{j=1}^K$ to a given control input $\{u_j\}_{j=1}^K$ and initial state $x_0$:

The control input is fed into the neural network model and produces predicted outputs outs $\{\bar{z}_j\}_{j=1}^K$ and covariances $\{\bar{Q}_j\}_{j=1}^K$.

The Kalman-filter algorithm is applied iteratively to the state estimates where in each time step, $z_k$ is replaced by $\bar{z}_k$ and $Q_k$ by $\bar{Q}_k$.

The computationally expensive task of training the Recurrent Neural Network (RNN) may be carried out offline in advance, while the state-prediction only uses a forward evaluation of the RNN and the Kalman-filter equations, which can be solved numerically with very low computational costs. Hence, in most cases the proposed state prediction method is expected to be calculated faster than real-time.

Figure 3:
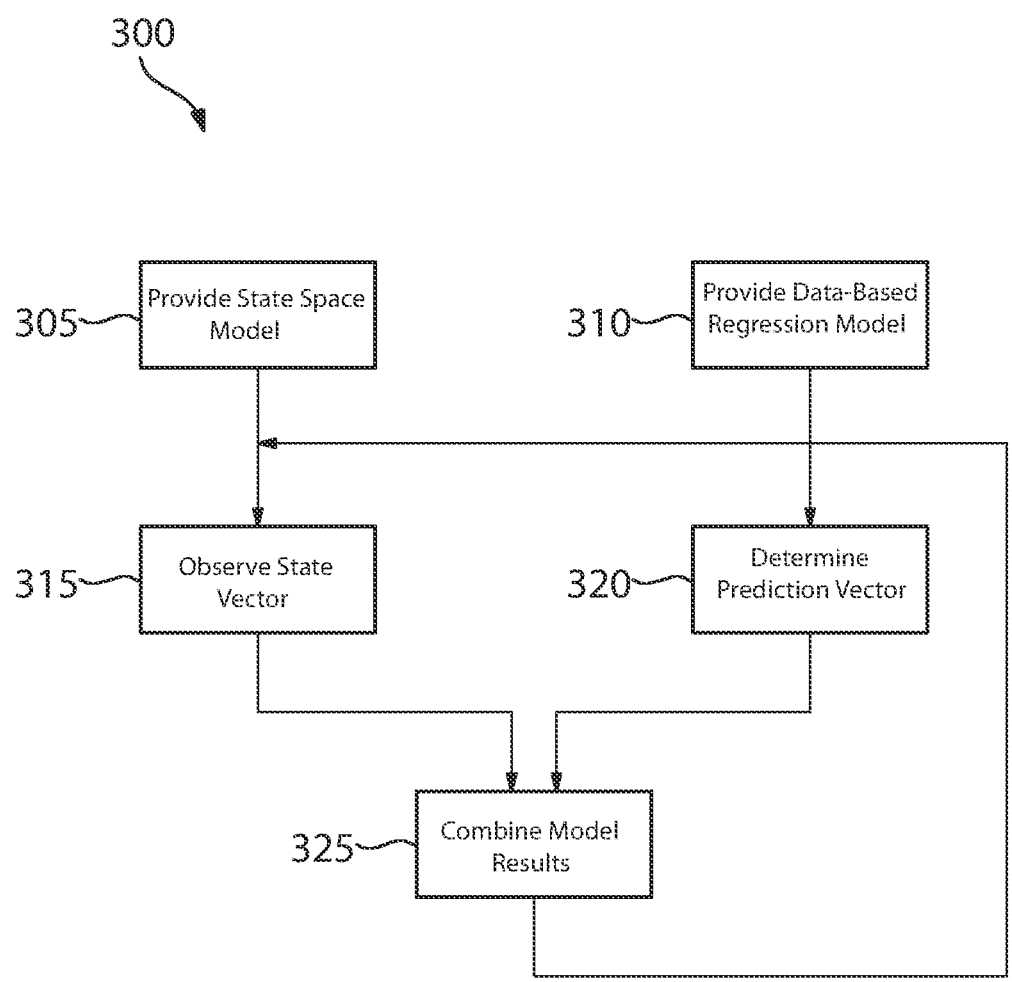
FIG. 3 shows an exemplary physical system and an exemplary apparatus for prediction of a state of the physical system.

FIG. 3 shows a flow chart of an exemplary method that may be based on the above described methods 100 and/or 200 of FIGS. 1 and 2, respectively. In a step 305, a state space model of behaviour of a physical system is provided, the model including covariances for state transition and measurement errors. In a step 310, a data-based regression model for prediction of state variables of the physical system is provided.

The two models have different strengths and weaknesses (or limitations) as was discussed above. In a step 315, a state vector comprising state variables of the physical system is observed. Similarly, in a step 320, a prediction vector of state variables based on the state vector is determined using the regression model.

Results of the two models are then combined in a step 325 by using a Bayesian filter. The method 300 may start over and loop over steps 315-325 for continuous operation.

Figure 4:
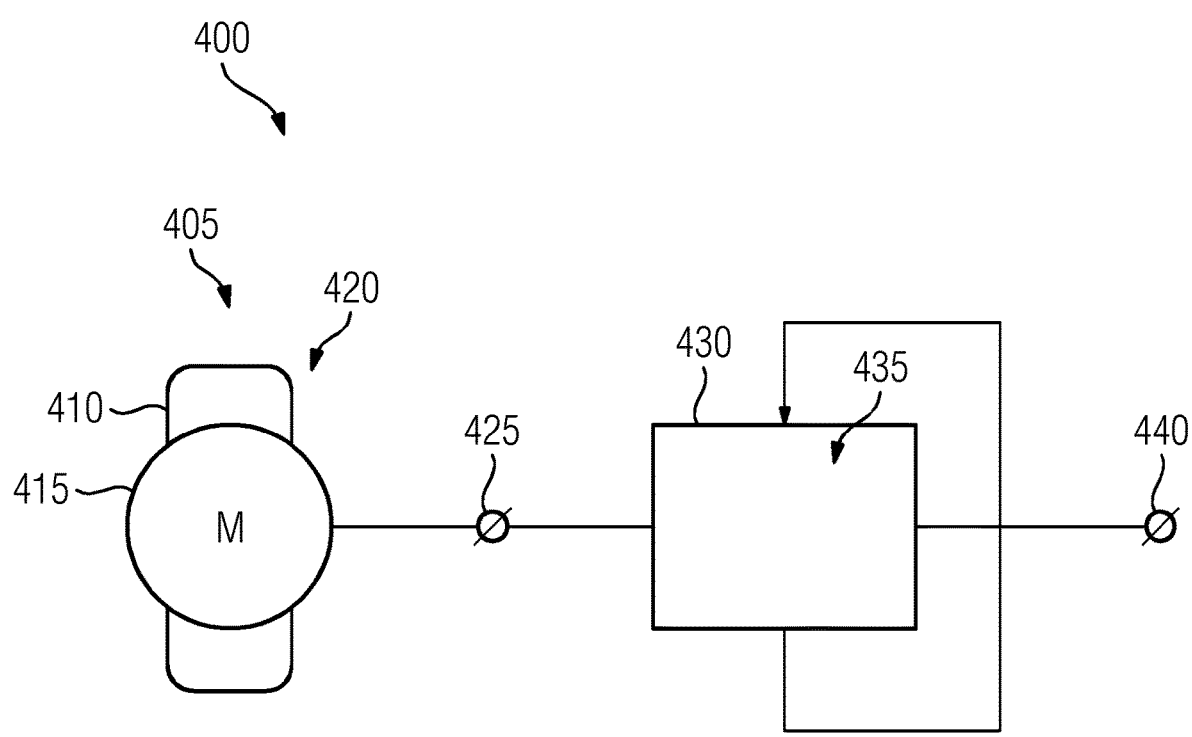
FIG. 4 shows a depiction of a physical system that is represented by an exemplary asynchronous electric motor.

FIG. 4 shows a depiction 400 of a physical system 405 that is represented by an exemplary asynchronous electric motor, although embodiments of the present invention are not limited to electric machinery. The electric motor 405 may be a large drive motor for an elevator, a belt conveyor or a sewage pump, potentially with a maximum power in the range of up to 100 kW or more. The motor 405 comprises a stator 410 and a rotor 415. On the motor 405 there may be one or more sensors 420 to pick up conditions of motor 405, like a temperature in a predetermined position, a rotating speed, a provided torque or an electric current.

Via an optional first interface 425 the measurements are made available to an apparatus 430 that is adapted to make a state variable forecast based on the received measurements. The apparatus 430 comprises processing means 435 which may comprise a programmable microcomputer or microcontroller. The processing means 435 is adapted to carry out a method for state variable prediction, especially according to method 300. Features or advantages of the method 300 may be applied to the system 405 or vice versa. Carrying out said method 300 may comprise execution of a computer program product with program code means. The determined forecast for one or more state variables may be provided via an optional second interface 440.

The forecast may also be used for protection of motor 405. Should the forecast state indicate a pending critical situation of motor 405, say, an overheating about to take place, electrical power to the motor 405 may be temporarily reduced or cut. To determine a critical situation, a forecast state may be compared against a predetermined threshold. Other approaches comprise observation of the rising speed of a predicted state variable or a combination of several state variables fulfilling a predetermined condition. The condition may for instance be given in the form of a predetermined polynomial, the value of which may exceed a predetermined threshold upon a pending critical situation. The apparatus 430 may also be adapted to output a signal that hints at the pending critical situation or activate means to prevent the situation.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for predicting a future state of a physical system, the method comprising:
   providing a state space model of behaviour of the physical system, the state space model including covariances for state transition and measurement errors;
   providing a data-based regression model for prediction of state variables of the physical system;
   observing a state vector comprising state variables of the physical system;
   determining a prediction vector of state variables based on the state vector, using the data-based regression model;
   combining an output of the state space model with an output of the data-based regression model through a Bayesian filter implemented with a Kalman filter to produce a joint state prediction, wherein the combining further includes replacing at least one state vector of the Kalman filter with the prediction vector determined using the data-based regression model; and
   outputting a signal to activate a countermeasure within the physical system to prevent a pending critical situation of the physical system.

2. The method according to claim 1, wherein the Bayesian filter is an Extended Kalman filter.

3. The method according to claim 1, wherein the data-based regression model comprises a trained Recurrent Neural Network.

4. The method according to claim 3, wherein the physical system is time continuous, the Recurrent Neural Network is interpolated between discrete time steps and the Bayesian filter comprises a Continuous Kalman Filter.

5. An apparatus comprising:
   an interface for observing a state vector comprising state variables in a physical system;

a processing means, adapted to carry out the method according to claim 1.

6. The method according to claim 1, further comprising: outputting a signal that identifies a pending critical situation of the physical system.

7. The method according to claim 1, further comprising: protecting a motor of the physical system based on the future state of the physical system.

8. The method according to claim 1, further comprising:
receiving measurements from one or more sensors of the physical system;
providing a state variable forecast based on the measurements;
determining that the state variable forecast indicates a pending critical situation of the physical system by comparing the state variable forecast to a predetermined threshold; and
implementing a countermeasure within the technical system to prevent an occurrence of the pending critical situation.

9. The method according to claim 1, further comprising:
splitting an available historical data of the physical system into a training data set and a validation data set;
training the data-based regression model using the training data set; and
applying the data-based regression model to the validation data set for predicting system outputs to given inputs.

10. The method according to claim 1, wherein the at least one state vector of the Kalman filter relates to a time step.

\* \* \* \* \*